(No Model.)
G. M. ROAT.
HAME FASTENER.
No. 485,751.  Patented Nov. 8, 1892.
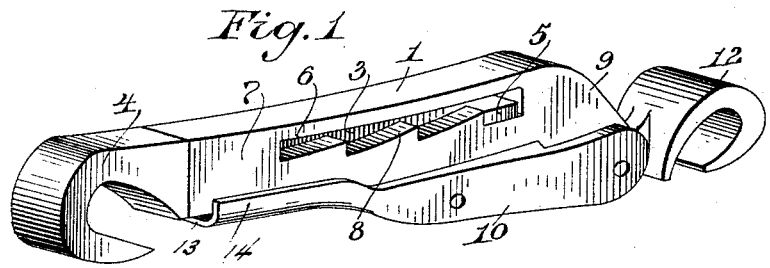
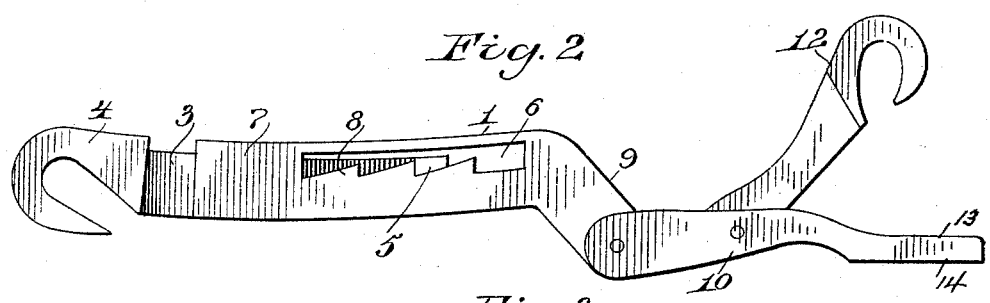
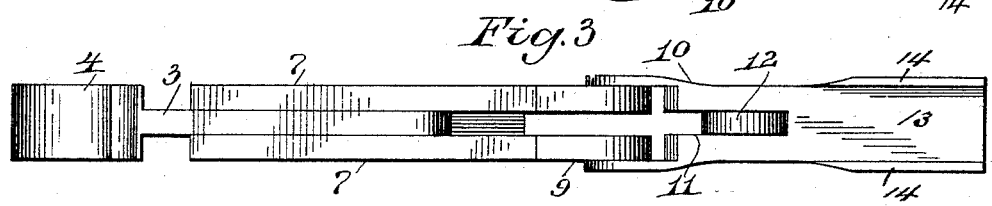
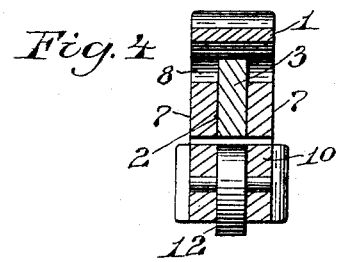
Witnesses  
C. M. Gallaher  
H. F. Riley  
Inventor  
Geo. M. Roat  
By his Attorneys,  
C. A. Snow & Co.
THE NORRIS PETERS CO., PHOTO-LITHO., WASHINGTON, D. C.

UNITED STATES PATENT OFFICE.

GEORGE M. ROAT, OF PILLAR POINT, NEW YORK, ASSIGNOR OF ONE-HALF TO FRED. W. REEVES, OF SAME PLACE.

HAME-FASTENER.

SPECIFICATION forming part of Letters Patent No. 485,751, dated November 8, 1892.

Application filed March 19, 1891. Serial No. 385,674. (No model.)

*To all whom it may concern:*

Be it known that I, GEORGE M. ROAT, a citizen of the United States, residing at Pillar Point, in the county of Jefferson and State of New York, have invented a new and useful Hame-Fastener, of which the following is a specification.

The invention relates to improvements in hame-fasteners.

The object of the present invention is to simplify and improve the construction of hame-fasteners and to enable the same to be locked and unlocked to secure and release hames and provide means whereby the fasteners may be readily adjusted to large and small hames.

The invention consists in the construction and novel combination and arrangement of parts hereinafter fully described, illustrated in the accompanying drawings, and pointed out in the claims hereto appended.

In the drawings, Figure 1 is a perspective view of a hame-fastener constructed in accordance with this invention, the parts being shown in their folded or locked position. Fig. 2 is a side elevation, the parts being unfolded. Fig. 3 is a reverse plan view. Fig. 4 is a transverse sectional view, the parts being in position shown in Fig. 1.

Referring to the accompanying drawings, 1 designates a casing having a closed top and which is provided with a longitudinal opening 2, in which is arranged a shank 3 of a longitudinal hook 4, adapted to engage the ring of one of a pair of hames and arranged at one end of the casing. The inner end of the shank is provided on one side with laterally-extending lugs 5, which are arranged in longitudinal openings 6 of the sides 7 of the casing and adapted to engage the teeth 8, formed at the lower sides of the openings, whereby the hook 4 is capable of adjustment. The end 9 of the casing is curved downward and is bifurcated, the bifurcation forming a continuation of the opening 2, and pivoted to the end 9 is one end of the locking-lever 10, which has its end bifurcated and the bifurcation 11 extends inward about one-half the length of the locking-lever, and centrally pivoted to the locking-lever and arranged in the bifurcation 11 at the inner end thereof is one end of a hook 12. The hame-fastener is locked by swinging the operating-lever and bringing the same against the casing and is unlocked by carrying the free end of the lever away from the casing, as will be well understood. The end of the casing is pivoted in the bifurcation 11, and the hook 12 when the parts are locked is arranged in the bifurcations of the casing and the locking-lever.

The free end 13 of the locking-lever 10 is dished or provided with flanges 14, which lie against the sides of the lower portion of the casing 1, and provide a close fitting of the end 13 against the bottom of said casing and assists in sustaining a locked position of the parts.

From the foregoing description and the accompanying drawings, the construction, operation, and advantages of the invention will readily be understood.

What I claim is—

A hame-fastener comprising the casing provided with a closed top portion and having a longitudinal opening 2 extending therethrough and transverse openings 6 in the opposite sides thereof, with teeth 8 at the bottom walls of the said openings 6, said casing also having a rear downwardly-extending bifurcated end 9, the hook 4, having a shank 3 adjustably arranged in the opening 2 and provided at the inner end of the shank with oppositely-disposed and laterally-extending lugs 5 to project through the openings 6 and engage the teeth 8, the operating-lever 10, provided with the bifurcation 11 and pivotally connected to the bifurcated end of the casing and having a free end which is dished, and flanges to fit against the bottom of the forward part of the casing, and a hook 12, pivoted to the operating-lever at a point intermediate of the ends of the latter and arranged in the bifurcation 11 and adapted to fold in the said bifurcated end 9 of the casing, substantially as described.

In testimony that I claim the foregoing as my own I have hereto affixed my signature in presence of two witnesses.

GEORGE M. ROAT.

Witnesses:
 ELIOT ROAT,
 WILL REEVES.